United States Patent [19]

Bethea et al.

[11] 4,071,492
[45] Jan. 31, 1978

[54] POLYURETHANE-UREA ELASTOMERS BASED ON PROPYLENE OXIDE-TETRAHYDROFURAN COPOLYMERS

[75] Inventors: Tristram Walker Bethea, Fairlawn; Shingo Futamura, Seville, both of Ohio

[73] Assignee: The Firestone Tire & Rubber Company, Akron, Ohio

[21] Appl. No.: 674,459

[22] Filed: Apr. 7, 1976

[51] Int. Cl.$^2$ ............... C08G 18/32; C08G 18/48; C08K 5/12
[52] U.S. Cl. ............... 260/31.8 R; 260/77.5 AM; 260/77.5 AP
[58] Field of Search ............. 260/77.5 AM, 77.5 AP, 260/31.8 R

[56] References Cited

U.S. PATENT DOCUMENTS

| | | | |
|---|---|---|---|
| Re. 28,424 | 5/1975 | McGillvary | 260/77.5 AM |
| 3,404,131 | 10/1968 | Taub | 260/77.5 |
| 3,425,999 | 2/1969 | Axelrood | 260/77.5 |
| 3,489,723 | 1/1970 | Kraft | 260/77.5 AM |
| 3,681,290 | 8/1972 | Meckel et al. | 260/77.5 AM |
| 3,755,261 | 8/1973 | Van Gulick | 260/77.5 AM |
| 3,888,831 | 6/1975 | Kogon | 260/77.5 AM |
| 3,891,606 | 6/1975 | Kogon | 260/77.5 AM |
| 3,899,438 | 8/1975 | Kalil | 260/77.5 AM |
| 3,900,447 | 8/1975 | Van Gulick | 260/77.5 AM |

FOREIGN PATENT DOCUMENTS

| | | | |
|---|---|---|---|
| 208,981 | 1/1956 | Australia | 260/77.5 AM |

*Primary Examiner*—H.S. Cockeram

[57] ABSTRACT

A polyurethane-urea elastomer is prepared by reacting a copolymer of propylene oxide and tetrahydrofuran having hydroxyl end groups with an organic polyisocyanate and the isocyanate-terminated polymer is then reacted with an aromatic diamine in either bulk or solution process.

18 Claims, No Drawings

POLYURETHANE-UREA ELASTOMERS BASED ON PROPYLENE OXIDE-TETRAHYDROFURAN COPOLYMERS

BACKGROUND OF THE INVENTION

The present invention relates to a polyurethane-urea elastomer wherein the soft segment is made from a copolymer of propylene oxide and tetrahydrofuran. More specifically, the invention relates to the production of solution and bulk chain extended elastomers, one component of which comprises propylene oxide and tetrahydrofuran copolymers which can be utilized in various forming operations such as molding, casting, extruding and the like to manufacture various articles.

Heretofore, polyurethanes have been generally produced from various hydroxyl terminated low molecular weight polymers such as polyesters, polyethers and the like as well as from a number of specific polymers such as either only poly(propylene oxide) or poly(tetrahydrofuran) and blends thereof. In general, these polymers do not possess good flexibility life at ambient temperatures.

More recently, U.S. Pat. No. 3,404,131, granted Oct. 1, 1968 to Taub, relates to polyurethane-urea elastomers wherein a molar insufficiency of an aromatic diisocyanate is utilized followed by an adequate remaining excess molar amount of an aliphatic diisocyanate with the copolymer then extended with solely a single aliphatic diamine, p-menthane-1,8-diamine. However, this polymer does not relate to and cannot be utilized for the production of bulk polyurethane-urea elastomers. Moreover, properties of the produced elastomers are generally poor.

U.S. Pat. No. 3,425,999 granted Feb. 4, 1969 to Axelrood, also relates to polyurethane-urea elastomers utilizing a copolymer of ethylene oxide and tetrahydrofuran having a hydroxyl-containing compound of a functionality of at least two. This patent solely utilizes ethylene oxide as a comonomer with tetrahydrofuran, does not relate to a solution process polymer and the polymer has very poor physical properties.

SUMMARY OF THE INVENTION

It is an object of the present invention to provide a polyurethane-urea elastomer utilizing a copolymer of propylene oxide and tetrahydrofuran.

It is a yet further object of the present invention to provide a polyurethane-urea elastomer, as above, which has good flexibility, good tensile strength and good low temperature modulus.

It is a yet further object of the present invention to provide a polyurethane-urea elastomer, as above, which is prepared by reaction with diisocyanates.

It is a yet further object of the present invention to provide a polyurethane-urea elastomer, as above, which is prepared by chain extension in bulk, that is without the utilization of a solvent, or in a solvent.

It is a yet further object of the present invention to provide a polyurethane-urea elastomer, as above, which is prepared by chain extension with an aromatic diamine.

It is a yet further object of the present invention to provide a polyurethane-urea elastomer, as above, wherein elastomers made in solvents are made by chain extension with unshielded aromatic diamines, and elastomers made in bulk are made by chain extension with shielded aromatic diamines.

It is a yet further object of the present invention to provide a polyurethane-urea elastomer, as above, wherein both solvent and bulk elastomers have unexpected physical properties.

It is a still further object of the present invention to provide a polyurethane-urea elastomer, as above, in which the amount of propylene oxide in the propylene oxide-tetrahydrofuran copolymer is from about 5 to about 75 percent.

These and other objects of the present invention will become apparent from the following specification which describes in detail various embodiments without attempting to discuss all of the modifications in which the invention might be embodied; the invention being measured by the appended claims and not by the details of the specification.

In general, a polyurethane-urea elastomer comprises, the reaction of propylene oxide-tetrahydrofuran copolymers, polyisocyanates and diamine chain extenders, said copolymers containing hydroxyl end groups, said polyisocyanates reacted with said hydroxyl terminated copolymers to form compounds having isocyanate end groups, the equivalent ratio of said polyisocyanates to said hydroxyl end groups ranging from about 1.25 to about 3.0, said diamines being aromatic diamines, said aromatic diamines reacted with said isocyanate end groups to chain extend and form said polyurethane-urea elastomer, the equivalent ratio of said aromatic diamines to said isocyanate end groups ranging from about 0.8 to about 1.2.

DESCRIPTION OF THE PREFERRED EMBODIMENTS

According to the concepts of the present invention, a polyurethane-urea elastomer is produced from a copolymer of propylene oxide and tetrahydrofuran utilizing polyisocyanates to form a prepolymer and chain extension with aromatic diamines in either a bulk of solvent process. The polyurethane-urea elastomers have good and unexpected physical properties. For example, the elastomers have very good flex properties as well as good low temperature properties such as hardness and tensile. Additionally, a bulk polymer may readily be produced in the desired shape by casting, molding, and the like.

The propylene oxide-tetrahydrofuran copolymer may generally contain from about 5 to about 75 percent of propylene oxide based on the total weight of the copolymer with a more desirable range being from about 15 to about 50 percent in either the production of a solvent elastomer or a bulk elastomer. An amount of about 25 to 40 percent of propylene oxide has been found to be very desirable. The total molecular weight of the copolymer may generally range from about 300 to about 10,000 with a preferred range being from about 750 to about 2,000. During copolymerization, the temperature range may range from about −30° C to about 180° C and desirably from −10° C to about 50° C.

During the copolymerization, a polyol, that is a compound terminated by a plurality of hydroxyl groups, is desirably utilized so that the copolymer is terminated with hydroxyl end groups and has a desirable molecular weight. Generally any diol containing from 2 to about 20 carbon atoms and more desirably a diol having from 2 to about 7 carbon atoms may be utilized and such compounds are well known to the art. In lieu of a diol, water may be utilized. Examples of specific diols include ethylene glycol, the various propylene glycols, the various butanediols, and the various hexanediols. By the term, the "various butanediols, etc", is meant that the various isomers of the diol or glycol compound can also be utilized. Preferred compounds include ethylene glycol, the various propane diols and the various butanediols with 1,4-butanediol being highly preferred. Another group of polyols are the triols and tetraols containing from 3 to 4, respectively, to about 20 carbon atoms. Such compounds may be utilized in the preparation of tri- or tetra-hydroxyl terminated copolymers which may be used to impart cross-linking to the urethane-urea elastomers where desired. Specific examples include trimethylolpropane and pentaerythitol.

Of course, the molecular weight of the propylene oxide-tetrahydrofuran copolymer will largely depend upon the amount of the diol utilized. Generally, a range of from about 0.005 to about 3 moles of diol or water per 1,000 grams of monomer (propylene oxide and tetrahydrofuran) may be utilized. A more desirable amount is from about 0.05 to about 1.5 with a highly desirable amount being from about 0.2 to about 1.25 moles.

Before the copolymer is reacted with a polyisocyanate, active hydrogens such as water, alcohols and the like are removed from the copolymer, the reaction vessel or reaction environment as well as from all compounds added to the vessel. Removal of the active hydrogens, of course, insures that the polyisocyanate may freely react with the copolymer and not be tied up by any side reactions. The standard procedure is to add the copolymer and various other compounds, if any, to the reaction vessel, heat the vessel and apply a vacuum. The vessel is then generally purged with an inert gas such as nitrogen, helium and the like to remove any remaining active hydrogens as well as to insure a favorable atmosphere into which the polyisocyanate may be added in any conventional manner.

The hydroxyl terminated propylene oxide-tetrahydrofuran copolymer is reacted with a polyisocyanate to give a urethane prepolymer having isocyanate end groups. The polyisocyanates utilized may be represented by the formula:

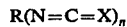

R(N=C=X)$_n$ where R can be an aliphatic containing from 2 to about 20 carbon atoms, a cycloaliphatic containing from 4 to about 20 carbon atoms and an aromatic containing from 6 to about 20 carbon atoms with n being an integer of either 2 or 3, preferably 2, and X is a chalcogen (oxygen or sulfur). Generally, it has been found that aromatic diisocyanates and aromatic diisothiocyanates give good properties and results and thus are highly preferred in the present invention. Specific examples of aromatic diisocyanates include 4,4'-diphenylmethane diisocyanate, 2,4-tolylene diisocyanate, 1,5-naphthalene diisocyanate, 1,4-benzene diisocyanate, 3,3'-dimethyoxy-4,4'-biphenyl diisocyanate, m-phenylene diisocyanate, xylylene diisocyanate and the corresponding diisothiocyanate. Of these compounds, toluene diisocyanate is highly preferred.

The equivalent ratio of the diisocyanates to the hydroxyl end groups of the copolymer ranges from about 1.25 to about 3.0 and more particularly, from about 1.5 to about 2.25, and preferably from about 1.75 to about 2.25, so that generally the hydroxyl terminated copolymers are end-capped with an isocyanate group and not chain extended. The reaction may be carried out at or about atmospheric pressure under ambient temperatures. More specifically, a broad temperature range of from 0° to about 125° C may be utilized or a narrower range of from about 25° C to about 100° C. A preferred range extends from about 60° C to about 80° C.

Additionally, it has been found that the formation of the prepolymer with the polyisocyanate may be accelerated through the use of conventional catalysts. Convenient catalysts include dibutyltin dilaurate, dibutyltin di-2-ethylhexanoate, stannous chloride, phenyl mercuric acetate, phenyl mercuric oleate, copper naphthenate, zinc naphthenate, chromium acetylacetonate, tributyl phosphine, N-ethylmorpholine, triethylamine, ferric acetylacetonate, titanium acetylacetonate, tetra-2-ethylhexyl titanate, copper acetylacetonate, vanadium acetylacetonate, vanadyl acetylacetonate, tetra-isopropyl titanate, stannous 2-ethylhexanoate, cobalt naphthenate, dibutyltin dibutoxide, and dibutyltin acetylacetonate. Dibutyltin dilaurate is usually preferred. Generally, an amount of from about .02 percent to about 0.5 percent may be utilized based upon the hydroxyl terminated compounds by weight.

The formation of the prepolymer and the curing or chain extending reaction can either be carried out in a solvent such as DMF (dimethyl formamide), pyridine and other compounds in which the prepolymer is soluble, or in bulk, that is, in the absence of any solvent. From a pragmatic standpoint, bulk chain extension is often desirable since the polymer can be utilized in a great number of ways to form numerous articles as by casting, extruding, injection molding, molding and the like. As well known to those skilled in the art, the production of solution made elastomers such as urethane-ureas are practical usually only for forming films or coatings and thus greatly limit the utility of the elastomer. Should the prepolymer of the present invention be chain extended in the presence of a solvent, the temperature of the reaction is generally limited by, of course, the boiling point of the solvent. Thus, if DMF is utilized, the reaction temperature will range from about 0 to about 100° C at atmospheric pressure. Of course, at higher pressures, higher temperatures may be utilized. However, when DMF is utilized, care must be taken not to carry the reaction out, at or near the boiling point of DMF to avoid decomposition. Generally, a fairly large amount of solvent is utilized since it acts as a temperature control for the reaction and reduces the viscosity in the vessel as the viscous urethane-urea polymers are formed. A desirable amount has been found roughly to range from about 4 liters to about 5 liters based upon 1,000 grams of prepolymer although much higher and lower amounts may be utilized.

Since an excess of diisocyanate may be utilized, free diisocyanates will exist as well as isocyanate end capped copolymers. However, the free isocyanates will largely be incorporated into the polyurethane-urea elastomer upon chain extension. Regardless of whether the chain extension occurs in solvent or in bulk, it is important that only aromatic diamines be utilized to react with the unreacted isocyanate end groups of the prepolymer or of the free diisocyanates and form the polyurethane-urea elastomer. The diamines may be non-symmetrical but symmetrical compounds are preferred. Any aromatic diamine may be utilized for solvent chain extension whereas only "shielded" diamines are utilized for bulk chain extension. The diamines generally contain from 6 to about 20 carbon atoms with specific examples being p-phenylene diamine, m-phenylene diamine, 4,4'- methylenebis (2-methoxyaniline), 4,4'-methylenebis(N-methylaniline), 2,4-toluene diamine, 2,6-toluene diamine, benzidine, 3,3'-dimethylbenzidene, 3,3'-dimethyoxybenzidine, dichlorobenzidine, methylene bis(2-chloroaniline), 4,4'-methylene dianiline and racemic 2,3-di(4-aminophenyl) butane. Preferred aromatic diamines include p-phenylene daimine, and 4,4'-methylene dianiline with 2,6-toluene diamine being a desired diamine.

In order to produce bulk polyurethane-urea elastomers according to the present invention, it is necessary that shielded aromatic diamines be utilized, otherwise premature cure would occur. By "shielded" is meant an aromatic diamine which does not readily react with an isocyanate group at ambient or low temperatures such as from about 20° C up to about 50° C or 80° C. The "shielded" diamine usually exists as a chemical or physical protected amine, or as a chemically less reactive amine in contrast to a simple hydrocarbon chain containing an unprotected amine. Generally, "shielded" diamines will not react for a minimum time period of approximately 2 to 3 minutes and at temperatures below approximately 80° C or 100° C. Thus, adequate mixing time is provided as is a smooth reaction of the amine compound. Specific examples of shielded aromatic diamines include dichlorobenzidine and methylene bis(2-chloroaniline), (MOCA). Another example is a complex of racemic 2,3-di(4-aminophenyl) butane and a salt. However, a preferred compound is the complex of 4,4'-methylene dianiline and a salt. Generally, the dianiline complex includes the reaction products of 4,4'-methylene dianiline with the following salts at a ratio of about 3 moles of methylene dianiline to 1 mole of salt; sodium chloride, sodium bromide, sodium iodide, sodium nitrite, lithium chloride, lithium bromide, lithium iodide, lithium nitrate and sodium cyanide. The butane complex involves the reaction products of racemic 2,3-di(4-aminophenyl)butane with the following salts at approximately a ratio of 3 moles of diamine to about 1 mole of salt; sodium chloride, sodium bromide, sodium iodide, potassium chloride, potassium bromide, potassium iodide, rubidium chloride, rubidium bromide, rubidium iodide, cesium chloride, cesium bromide and cesium iodide. The complex of methylene dianiline and a salt are generally preferred with the preferred salt being sodium chloride (Caytur 21 manufactured by DuPont) or lithium chloride. These shielded diamines may be also utilized in the formation of the solvent elastomer, as noted above. However, generally they are more expensive and will not readily react at ambient temperatures. Hence, they are generally not utilized.

The equivalent ratio of the non-shielded and shielded aromatic diamines to the unreacted isocyanate end groups of the prepolymer and any free diisocyanates may range from about 0.8 to about 1.2 with a desired range being from about 0.9 to about 1.1. Should a higher ratio than 1.2 be utilized, generally chain extension is limited and a soft elastomer having poor physical properties is obtained. The chain extension reaction can be carried out usually at or about atmospheric pressure and at temperatures ranging from 0 to about 200° C with a more favorable range being from about 85° C to about 150° C for the solvent type reaction. A preferred range extends from about 100° C to about 125° C. The temperature range for the shielded diamine is from about 50° C to about 200° C with a more favorable range being from 80° C to about 150° C. A preferred range is from about 100° C to 140° C.

As clearly indicated by the data set forth below, the polyurethane-urea elastomers produced according to the present invention whether in bulk utilizing shielded aromatic diamines or in solvents utilizing shielded or non-shielded aromatic diamines, produce excellent and unexpected properties, for example, good hardness, tensile strength and flex at low or ambient temperatures. Surprisingly, the viscosity of the copolymer polyethers are very low. Generally, it has been found that low viscosity properties exist whenever the propylene oxide content of the copolymer is 30 percent or greater by weight. Thus, in effect, the copolymer polyether of the present invention possesses the low viscosity of polypropylene polymers and yet upon chain extension possesses the good physical properties of tetrahydrofuran polymers in contrast to the poor properties of chain extended polypropylene oxide. This result was further clearly unexpected in view of the very poor physical properties obtained by a diamine chain extended polyurethane-urea elastomer utilizing a copolymer of ethylene oxide and tetrahydrofuran.

The polyurethane-urea elastomers of the present invention, both bulk and solvent chain extended, may be utilized for various articles as conventional urethane polymers with preferred uses being automobile bumpers, gravel pans for automobiles, films, sheathing and the like. A highly and specific preferred use for the bulk elastomers of the present invention is in the utilization of tire bodies or carcasses.

Of course, the polyurethane-urea elastomers which are prepared by chain extension with polyols having 3 or 4 hydroxyl end groups will result in compounds which have very low flex, very low elongation and high tensile. Hence, these compounds generally will not be suited for the above uses but rather for rugged applications such as helmets and generally for various injection molding parts such as automotive steering wheels, toy handles, strong plastic structural reinforcement parts and the like.

Additionally, the polyurethane-urea elastomers of the present invention will have soft portions within the polymer corresponding to the segments composed of the copolymer of tetrahydrofuran and propylene oxide and hard portions corresponding to the segment formed by the reaction of the isocyanate and the aromatic diamine. Of course, depending upon the ratios of the number of hard portions to the number of soft portions which can be varied during make-up of the polymer, the applications will vary as will the physical properties. In other words, a high amount of hard portions will yield a polymer whicn tends to have higher tensile strength, higher low strain modulus but lower flex strength. Hence, to some extent, the polyurethane-urea elastomers of the present invention can be tailor-made to specific applications.

The present invention will be better understood by reference to the following examples:

GENERAL PROCEDURES

I. The tetrahydrofuran/propylene oxide (THF/PO) copolymer was typically prepared according to the following procedure: The following materials were charged, in any order, to a stainless-steel reactor (3.8 × $10^{-3}$ $m^3$ capacity): 0.75 kg tetrahydrofuran, 0.25 kg propylene oxide, 1.26 kg 1,2-dichloroethane, and 53 g 1,4-butanediol. The amount of butanediol was governed by the molecular weight of the copolymer desired. The reactor and its contents were preferably 0° C and as low as −30° C could be used if a very slow reaction was desired. Gauge pressures from 0 to 60 psig (0 to 414 KPa) could be used. After mixing the above ingredients, 1.67 g of boron trifluoride diethyl ether complex were charged to the reactor to initiate the polymerization. After 15 hours, the reaction was essentially complete and termination could be effected with water, preferably containing some sodium hydroxide. The polymer solution was removed from the reactor, terminated with water, washed with water several times to remove initiator residues, and finally dried. Removal of the solvent left typically 0.7 kg of copolymer with $\overline{M}n$ near 1.0 kg/mole. The copolymer was approximately 35 percent propylene oxide by weight.

II. A 0.50 kg portion of the above copolymer was placed in $10^{-3} m^3$ round bottomed flask and was degassed by heating to 70° C during four hours under vacuum; then 0.178 kg of 2,4-tolyene diisocyanate (corresponding to 2.04 equivalents of isocyanate to OH) was added with mechanical stirring under nitrogen. Then, 250 mg dibutyltin dilaurate catalyst was added with stirring and the temperature of the flask and its contents adjusted to 80° C. After 8 hours reaction, infrared analysis showed all hydroxyl groups had reacted with isocyanate. The excess isocyanate was removed by placing the prepolymer under high vacuum (about 0.1 mm of Hg(13.3Pa) at 70° C for 15-18 hours. The prepolymer was then ready for chain extension.

III. The polyurethane-ureas were then prepared as follows:

SOLUTION a. An appropriate amount of prepolymer was dissolved in a solvent such as N,N-dimethylformamide previously dried with calcium hydride and placed in a 3-neck round bottomed flask with nitrogen. A stoichiometric amount of the desired diamine was dissolved in DMF and placed in a dropping funnel and the entire system was flushed with nitrogen. The amine solution was slowly dropped into the prepolymer solution at 90° C with stirring. When infrared analysis showed all isocyanate had been consumed (by reaction with amine groups), chain extension was complete and the reaction was terminated by adding 5 g methanol and then coagulating the polymer by pouring the viscous solution into distilled water. The polymer was washed with water to remove as much DMF as possible and then dried in a vacuum oven (gauge pressure below 1.0 psi(6.9 KPa) at a temperature between 50° C and 90° C preferably at a pressure of 5 mm of Hg(67 Pa) and a temperature of 80° C.

BULK b. An alternate and highly preferred preparation of the polyurethane-ureas utilized the bulk chain extension of the above prepared prepolymer (or other prepolymers derived from homopolymers of tetrahydrofuran or propylene oxide) with a diamine. Generally, amines were prevented from reacting prematurely with the isocyanate by utilizing shielded aromatic diamines. The prepolymer and the shielded diamine were mixed usually in the presence of an inert plasticizer such as dioctyl phthalate. After sufficient stirring a uniform dispersion was obtained and the viscous dispersion was poured or injected into molds. Chain extension was effected by heating to 90° C to 125° C for periods up to 2 hours. These polymers had stress-strain properties comparable to those prepared with prepolymers of poly(tetrahydrofuran) and superior to those prepared from prepolymers of poly(propylene oxide).

EXAMPLE 1

Table I sets forth data with respect to polyurethane-urea polymers prepared according to the above General Procedure III(a) wherein the amount of hard segment (isocyanate and diamine) was varied and non-shielded aromatic diamines were used.

TABLE I

| | SOLVENT | | | | SOLVENT | | | |
|---|---|---|---|---|---|---|---|---|
| THF/PO Prepolymer Chain-Extended with P-Phenylene Diamine | | | | | Prepolymer Chain-Extended With Methylenedianiline | | | |
| $\overline{M}n$ of Copolymer (kg/mole) | 4.061 | 1.941 | 1.119 | 0.687 | 5.249 | 2.167 | 1.281 | 0.842 |
| % hard segment | 10 | 20 | 30 | 40 | 10 | 20 | 30 | 40 |
| DSV (in DMF) of polyurethane-urea in $m^3$/kg | 0.041 | 0.037 | 0.077 | 0.077 | 0.038 | 0.047 | 0.077 | 0.039 |
| Tg of poly (U-U) | −81° C | −76° C | −56° C | −45° C | −81° C | −70° C | −59° C | −45° C |
| Physical Properties | | | | | | | | |
| 10% Modulus psi | 185 | 550 | 1030 | 1550 | 50 | 250 | 325 | 560 |
| 10% Modulus MPa | 1.28 | 3.79 | 7.10 | 10.7 | 0.34 | 1.72 | 2.24 | 3.86 |
| Tensile Strength psi | 400 | 1265 | 6600 | 7200 | 300 | 525 | 5000 | 3700 |
| Tensile Strength MPa | 2.76 | 8.72 | 45.5 | 49.6 | 2.07 | 3.62 | 34.5 | 25.5 |
| Ultimate Elongation % | 300 | 600 | 1200 | 600 | 350 | 850 | 1200 | 900 |

EXAMPLE II

In a manner identical to that set forth in the General Procedure III(a), additional polyurethane-urea elastomers were prepared in solution utilizing various aromatic diamine chain extenders which had a polyether number average molecular weight ($M_n$) of about 1,000. The results are set forth in Table II.

TABLE II

| | AROMATIC DIAMINE | 10% MODULUS (psi) | TENSILE STRENGTH (psi) | ULT. ELONG. % |
|---|---|---|---|---|
| a. | p-phenylene diamine | 7.10 MPa (1030) | 45.5 MPa (6600) | 1200 |
| b. | 4,4'-methylene dianiline | 2.24 MPa ( 325) | 34.5 MPa (5000) | 1200 |
| c. | 2,6-toluene diamine | 5.80 MPa ( 840) | 8.90 MPa (1290) | 28 |

EXAMPLE III

In comparison, polyurethane-ureas prepared in solution utilizing aliphatic or cyclic diamines as the chain extending agents gave poor properties as set forth in Table III. The compounds of Table III were generally prepared in a manner identical to that set forth in the General Procedure III(a).

polyurethane-urea elastomer which had a tensile strength comparable to that of a chain extended tetrahy-

TABLE III

| | DIISOCYANATE | DIAMINE | 10% Mod (psi) | TEN. STR. (psi) | ULT. ELONG. (%) |
|---|---|---|---|---|---|
| a. | 1,6-diisocyanatohexane | ethylene diamine | 1.79 (260) | 5.86 ( 850) | 118 |
| b. | 4,4'-methylenebis (cyclohexylisocyanate) | 4,4'-methylenebis (cyclohexylamine) | 0.97 (140) | 17.6 (2550) | 1200 |

EXAMPLE IV

Table IV sets forth data of polyurethane-urea polymers prepared in bulk wherein Caytur 21 was utilized as a source of the shielded chain extending diamine. Caytur 21 is manufactured by DuPont and is 4,4'-methylene dianiline and a sodium chloride salt complex. The polyurethane-urea elastomers were prepared in a manner as set forth in the General Procedure III(b). The elastomers contained 20 parts of dioctyl phthalate as a plasticizer. Generally, 100 parts of prepolymer may contain up to 50 parts of plasticizer.

drofuran polymer at ambient temperature as well as at 100° C. Additionally, the flexibility of the chain extended copolymer of the present invention was also very similar to chain extended polytetrahydrofuran. However, the bulk viscosity was much lower and very comparable to that of polypropylene oxide. Of course, the tensile strength and the flexibility of copolymer of the present invention was much greater than that of a chain extended polypropylene oxide. Moreover, the chain extended tetrahydrofuran-propylene oxide copolymer of the present invention had a higher tensile strength and a much higher flex rating than that of a

TABLE IV

| | I THF/PO (62/38) COPOLYMER | | II POLY THF | | III POLY PO | |
|---|---|---|---|---|---|---|
| Mn of Diol (approx.) | 950 | | 1,000 | | 1,000 | |
| Shore A | 91 | | 95 | | 93 | |
| RT. Tensile, MPa (psi) | 32 | (4,646) | 27.8 | (4,025) | 24.0 | (3,475) |
| Elongation, % | 540 | | 510 | | 535 | |
| Modulus, 5%, MPa (psi) | 2.55 | ( 370) | 3.67 | ( 532) | 2.48 | ( 360) |
| 100%, MPa (psi) | 5.88 | ( 853) | 7.76 | (1,125) | 4.84 | ( 700) |
| 200%, MPa (psi) | 8.18 | (1,186) | 10.2 | (1,475) | 6.38 | ( 925) |
| 300%, MPa (psi) | 11.5 | (1,666) | 12.6 | (1,825) | 8.97 | (1,300) |
| 500%, MPa (psi) | 26.7 | (3,877) | 26.7 | (3,875) | 21.0 | (3,040) |
| 100° C Tensile, MPa (psi) | 16.8 | (2,433) | 15.2 | (2,200) | 12.2 | (1,770) |
| Elongation, % | 655 | | 500 | | 690 | |
| Modulus, 100% (psi) | 4.50 | ( 652) | 5.38 | ( 780) | 2.76 | ( 400) |
| 300% (psi) | 7.09 | (1,029) | 8.91 | (1,293) | 4.62 | ( 670) |
| Young's Modulus Index, ° C | −9** | | | | | |
| 0° Modulus, MPa (psi) | 62.2 | (9,105) | >68.9 | (10,000) | >68.9 | (10,000) |
| −20° Modulus, MPa (psi) | 88.9 | (12,900) | | | | |
| −40° Modulus, MPa (psi) | 242.2 | (35,130) | | | | |
| −60° Modulus, MPa (psi) | 565.2 | (81,980) | | | | |
| Texus Flex: Mathematical Average | 32,000 | | 32,500 | | 20,000** | |
| Bulk Viscosity of Diol, in mPa ·s (Centipoises) of the hydroxyl terminated polymer. | 180 | (180) | 805 | (805) | 140 | (140) |

| | IV BLEND OF POLY THF & POLY PO (63/37) | | V THF/PO (62/38) COPOLYMER | |
|---|---|---|---|---|
| Mn of Diol (approx.) | | | 1,100 | |
| Shore A | 94 | | 87 | |
| RT. Tensile, MPa (psi) | 29.0 | (4,200) | 23.2 | (3,364) |
| Elongation, % | 510 | | 570 | |
| Modulus, 5%, MPa (psi) | 3.08 | ( 446) | 2.25 | ( 327) |
| 100%, MPa (psi) | 5.86 | ( 850) | 4.30 | ( 623) |
| 200%, MPa (psi) | 8.45 | (1,225) | 5.77 | ( 837) |
| 300%, MPa (psi) | 11.5 | (1,675) | 7.54 | (1,094) |
| 500%, MPa (psi) | 28.1 | (4,075) | 15.2 | (2,204) |
| 100° C Tensile, MPa (psi) | 9.17 | (1,330) | 14.3 | (2,071) |
| Elongation, % | 380 | | 630 | |
| Modulus, 100% (psi) | 4.21 | ( 610) | 4.07 | ( 590) |
| 300% (psi) | 7.27 | (1,055) | 6.52 | ( 946) |
| Young's Modulus Index, ° C | | | −23 | |
| 0° Modulus, MPa (psi) | >68.9 | (10,000) | 49.6 | (7,198) |
| −20° Modulus, MPa (psi) | | | 64.1 | (9,297) |
| −40° Modulus, MPa (psi) | | | 162.7 | (23,602) |
| −60° Modulus, MPa (psi) | | | 604.5 | (85,665) |
| Texus Flex: Mathematical Average | 11,500 | | 115,000 | |
| Bulk Viscosity of Diol, in mPa ·s (centipoises) of the hydroxyl terminated polymer. | | | 220 | (220) |

**This data was not taken on this particular sample, but are representative of the data obtained on polymers of the same composition with other physical properties very similar.

As evident from Table IV, the tetrahydrofuran-propylene oxide copolymer of the present invention gave a 63/37 blend of polytetrahydrofuran and polypropylene oxide. The copolymer of tetrahydrofuran and propylene oxide set forth in Column V generally had a tensile strength similar to or higher than that of a polypropylene chain extended polymer. The lowering of the physical properties of the copolymer of Column V is attributed to the molecular weight of the copolymer which is much higher than the copolymer set forth in Column I. Nevertheless, this copolymer exhibited greatly increased flexibility.

Thus, it should be obvious from the data of Table IV that the tetrahydrofuran-propylene oxide copolymer produced according to the present invention gave a polyurethane-urea elastomer having a comparable tensile strength to the chain extended polytetrahydrofuran as well as much higher flexibility. However, the bulk viscosity was considerably lower and comparable to that of a chain extended polypropylene oxide. It is further noted that the remaining data such as modulus and Young's Modulus compares similarly. Thus, this table conclusively proves the unexpected results obtained with the copolymers of the present invention.

While in accordance with the patent statutes various preferred embodiments have been illustrated and described in detail, it is to be understood that the invention is not limited thereto, the scope of the invention being measured by the scope of the attached claims.

What is claimed is:

1. A polyurethane-urea elastomer, comprising,
the reaction product of propylene oxide-tetrahydrofuran copolymers, polyisocyanates and aromatic diamine chain extenders, said copolymers having a molecular weight of from about 300 to about 10,000 and containing from about 5 percent to about 75 percent of propylene oxide based upon the total weight of said copolymer,
said copolymers containing hydroxyl end groups,
said polyisocyanates reacted with said hydroxyl terminated copolymers to form prepolymers having isocyanate end groups, the equivalent ratio of said isocyanate groups of said polyisocyanates to said hydroxyl end groups ranging from about 1.25 to about 3.0,
said aromatic diamines having from 6 to about 20 carbon atoms and selected from the class consisting of shielded aromatic diamines and non-shielded aromatic diamines,
said prepolymer containing said isocyanate end groups chain extended through either bulk polymerization by reaction with said shielded aromatic diamines or through a solution polymerization by reaction with said non-shielded diamines to produce said polyurethane-urea elastomers, the equivalent ratio of amine groups of said aromatic diamines to said isocyanate end groups ranging from about 0.8 to about 1.2,
said copolymer containing hydroxyl end groups having a low viscosity,
said polyurethane-urea elastomers having good tensile strength at ambient temperatures and at 100° C, and good flex properties.

2. A polyurethane-urea elastomer according to claim 1, wherein said polyisocyanates have the formula:

$$R(N=C=X)_n$$

where R is an aliphatic chain containing from 1 to about 20 carbon atoms, a cycloaliphatic ring containing from 4 to about 20 carbon atoms, an aromatic nucleus containing from 6 to about 20 carbon atoms, and combinations thereof, X is oxygen or sulfur, and $n$ is 2 or 3.

3. A polyurethane-urea elastomer according to claim 2, wherein said non-shielded aromatic diamines are selected from the group consisting of p-phenylene diamine, m-phenylene diamine, 4,4'-methylenebis(2-methoxyaniline), 4,4'-methylenebis(N-methylaniline), 2,4-toluene diamine, 2,6-toluene diamine, benzidine, 3,3'-dimethylbenzidine, 3,3'-dimethoxybenzidine, and 4,4'-methylene dianiline.

4. A polyurethane-urea elastomer according to claim 3, wherein said aromatic diamines are selected from the class consisting of p-phenylene diamine, 2,6-toluene diamine, and 4,4'-methylene dianiline.

5. A polyurethane-urea elastomer according to claim 2, wherein said equivalent ratio of isocyanate groups of said polyisocyanates to said hydroxyl end groups ranges from about 1.5 to about 2.5 and said equivalent ratio of amine groups of said aromatic diamines to said isocyanate end groups ranges from about 0.9 to about 1.1.

6. A polyurethane-urea elastomer according to claim 5, wherein a compound selected from the class consisting of a polyol and water is added in the preparation of said copolymer so that the copolymers contain hydroxyl end groups, the amount of said polyol ranging from about 0.005 to about 3.0 moles per 1,000 grams of monomers.

7. A polyurethane-urea elastomer according to claim 6, wherein said shielded diamines are selected from the group consisting of dichlorobenzidine, methylene bis(2-chloroaniline), a complex of 4,4'-methylene dianiline and a salt, the ratio of said dianiline to said salt being from about 3 moles to 1 mole, and a complex of racemic 2,3-di(4-aminophenyl) butane and a salt, the ratio of said butane to said salt being about 3 moles to 1 mole, said salt of said dianiline complex selected from the class consisting of sodium chloride, sodium bromide, sodium iodide, sodium nitrite, lithium chloride, lithium bromide, lithium iodide, lithium nitrate and sodium cyanide, said salt of said butane compounds selected from the class consisting of sodium chloride, sodium bromide, sodium iodide, potassium chloride, potassium bromide, potassium iodide, rubidium chloride, rubidium bromide, rubidium iodide, cesium chloride, cesium bromide and cesium iodide.

8. A polyurethane-urea elastomer according to claim 7, wherein said equivalent ratio of isocyanate groups of said polyisocyanates to said hydroxyl end groups ranges from about 1.5 to about 2.5 and the equivalent ratio of amine groups of said aromatic diamine to said isocyanate groups ranges from about 0.9 to about 1.1.

9. A polyurethane-urea elastomer according to claim 8, wherein said copolymer is made by the copolymerization of tetrahydrofuran and propylene oxide monomers, a compound selected from the group consisting of water and a polyol being added to said copolymerization so that said copolymer contains hydroxyl end groups, the amount of said polyol and water ranging from about 0.05 to about 1.5 moles per 1,000 grams of monomers, said polyol selected from the groups consisting of diols having from 2 to about 20 carbon atoms, triols having from 3 to about 26 carbon atoms and tetraols having from 4 to about 20 carbon atoms.

10. A polyurethane-urea elastomer according to claim 8, wherein said copolymers contain from about 15 to about 50 percent of propylene oxide.

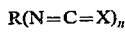

11. A polyurethane-urea polymer according to claim 10, wherein said preferred shielded diamines are said complex of 4,4'-methylene dianiline and a salt.

12. A polyurethane-urea polymer according to claim 11, wherein said salt is sodium chloride.

13. A polyurethane-urea polymer according to claim 12, wherein said equivalent ratio of isocyanate groups of said polyisocyanate to said hydroxyl end groups ranges from about 1.75 to about 2.25 and said copolymers contains from about 25 percent to about 40 percent of propylene oxide.

14. A polyurethane-urea polymer according to claim 13, wherein said diisocyanates are selected from the class consisting of 4,4'-diphenylmethane diisocyanate, 2,4-tolylene diisocyanate, 2,6-tolylene diisocyanate, 1,5-naphthalene diisocyanate, 1,4-benzene diisocyanate, 3,3'-dimethoxy-4,4'-biphenyl diisocyanate, m-phenylene diisocyanate, and xylylene diisocyanate.

15. A polyurethane-urea polymer according to claim 7, wherein said polymer is cast in the form of a tire carcass.

16. A polyurethane-urea polymer according to claim 14, wherein the molecular weight of said copolymers range from about 750 to about 2,000.

17. A polyurethane-urea elastomer according to claim 11 including a plasticizer, said plasticizer ranging up to 50 parts per 100 parts of a prepolymer made from said polyisocyanates and said copolymers containing hydroxyl end groups.

18. A polyurethane-urea elastomer according to claim 17, wherein said plasticizer is dioctyl phthalate.

* * * * *